US012346762B2

(12) United States Patent
Iozia et al.

(10) Patent No.: US 12,346,762 B2
(45) Date of Patent: Jul. 1, 2025

(54) TIRE PROVIDED WITH A TEMPORARY IDENTIFICATION LABEL

(71) Applicant: Bridgestone Europe NV/SA [BE/BE], Zaventem (BE)

(72) Inventors: Francesco Iozia, Rome (IT); Maria Cristina Caccami, Rome (IT); Daniel Ghislain Devogelaer, Zaventem (BE)

(73) Assignee: Bridgestone Europe NV/SA, Zaventem (BE)

( * ) Notice: Subject to any disclaimer, the term of this patent is extended or adjusted under 35 U.S.C. 154(b) by 85 days.

(21) Appl. No.: 18/286,825

(22) PCT Filed: Apr. 13, 2022

(86) PCT No.: PCT/EP2022/059840
§ 371 (c)(1),
(2) Date: Oct. 13, 2023

(87) PCT Pub. No.: WO2022/219025
PCT Pub. Date: Oct. 20, 2022

(65) Prior Publication Data
US 2024/0193396 A1 Jun. 13, 2024

(30) Foreign Application Priority Data
Apr. 14, 2021 (IT) .................. 102021000009365

(51) Int. Cl.
*G06K 7/00* (2006.01)
*B60C 9/02* (2006.01)
(Continued)

(52) U.S. Cl.
CPC .................. *G06K 7/00* (2013.01); *B60C 9/02* (2013.01); *B60C 15/04* (2013.01); *G06K 19/07764* (2013.01); *H01Q 1/2241* (2013.01)

(58) Field of Classification Search
CPC ...... B29D 30/00; B29D 30/0061; B60C 9/02; B60C 9/08; B60C 9/11; B60C 15/00;
(Continued)

(56) References Cited

U.S. PATENT DOCUMENTS 5,928,675 A 7/1999 Irie
6,273,670 B1 8/2001 Henson et al.
(Continued)

FOREIGN PATENT DOCUMENTS

| CN | 210441936 | * | 9/2019 |
| JP | 62280105 A | | 12/1987 |
| WO | 2020126757 A1 | | 6/2020 |

OTHER PUBLICATIONS

International Search Report, corresponding application No. PCT/EP2022/059840, Jul. 7, 2022, 3 pages.

*Primary Examiner* — Van T Trieu
(74) *Attorney, Agent, or Firm* — Patterson Intellectual Property Law, PC (57) ABSTRACT

A tire comprises a toroidal carcass, which has a central cavity and at least one body ply, which is partially folded onto itself and, hence, laterally has two turn-ups, each having an edge of the body ply resting against an intermediate portion of the body ply. Two annular beads are each surrounded by the body ply and having a bead core and a bead filler. An identification label is fixed in a removable manner, for example by gluing, and arranged in the area of an annular bead and supports a temporary RFID device, which can be read from a distance.

20 Claims, 7 Drawing Sheets

(51) Int. Cl.
*B60C 15/04* (2006.01)
*G06K 19/077* (2006.01)
*H01Q 1/22* (2006.01)

(58) Field of Classification Search
CPC ..... B60C 15/06; B60C 15/0607; B60C 19/00; G60K 7/00; G60K 7/01; G06K 7/07764; G06K 7/10; G06K 7/10009
See application file for complete search history.

(56) References Cited

U.S. PATENT DOCUMENTS

| | | |
|---|---|---|
| 6,362,443 B1 | 3/2002 | Kinoshita et al. |
| 2006/0096690 A1* | 5/2006 | Nakata .................. B60C 15/04 152/550 |
| 2006/0180547 A1* | 8/2006 | Widmer .................. B09B 3/00 210/631 |
| 2013/0174956 A1* | 7/2013 | Toyoda .................. B60C 15/06 152/541 |
| 2014/0049375 A1* | 2/2014 | Fenkanyn ........ G06K 19/07764 340/10.1 |
| 2015/0107751 A1* | 4/2015 | Palmisano .......... B65C 11/0289 156/64 |
| 2018/0045611 A1 | 2/2018 | Kraus et al. |
| 2020/0254827 A1 | 8/2020 | Petry Breier et al. |
| 2021/0053306 A1* | 2/2021 | Cassidy ............. G06K 7/10009 |

\* cited by examiner

TIRE PROVIDED WITH A TEMPORARY IDENTIFICATION LABEL

TECHNICAL FIELD

The invention relates to a tire provided with a temporary identification label (namely, with an identification label that is used only during the handling of the tire and is eliminated when the tire is fitted on the corresponding rim).

The invention finds advantageous application in the handling of so-called TBR ("Truck and Bus Radial") tires, namely tires with significant dimensions, to which explicit reference will be made in the description below without because of this loosing in generality.

PRIOR ART

Generally speaking, when tires need to be handled at the end of a production line (typically in order to load the tires into the freight container) or in a warehouse, operators use forklifts provided with a pair of forks that lift (at least) a stack of tires from the bottom (typically, when the stack of tires is resting on a pallet) or forklifts provided with clamps laterally clamping a stack of tires.

In recent years, so-called "smart" tires were developed, which are provided with RFID devices (wherein RFID stands for "Radio Frequency Identification"—typically transponders), which allow items of information, such as the identification, the features and the story of the tire, to be communicated from a distance.

As a consequence, operators, besides having to move the tires by means of a forklift, also have to be capable of accessing this information, thus reading, with a suitable reader, the RFID devices associated with the tires, for example in order to make sure that they are operating on the correct tires and/or in order to store, in an electronic register, possible changes to the position of the tires.

The operator handling the forklift is normally provided with a manual reader (namely, a light-weighted reader which can easily be transported); after having loaded the tires onto the forklift, the operators steps off the forklift and, approaching the tires with the reader, reads the corresponding RFID devices in order to identify the tires in a certain manner. However, this operating mode leads to an inefficient and large waste of time, since operators have to step off the forklift (hence, having to turn off the forklift and put the forklift in a safe parking configuration) and, furthermore, they have to place the manual reader close to each single tire in order to read the corresponding RFID device (namely, known manual readers are not capable of simultaneously reading the RFID devices of all the tires of a stack of tires, but the reader needs to be placed close to each single tire of the stack).

To this regard, it should be pointed out that the maximum reading distance of a RFID device incorporated in a single tire often amounts to approximately 1-2 metres and that a stack of tires has a height that normally exceeds 3 metres (hence, more than the maximum reading distance); furthermore, when several tires are close (stacked together), shielding and/or reflection phenomena can occur, which are due to metal parts of the tires and further reduce the maximum reading distance of the RFID devices incorporated in the tires.

In order to ensure the reading of the RFID devices of the tires, manufacturers suggested applying, in a removable manner and on the outer surface of the tires (namely, on the tread of the tires), an identification label, which supports an additional and temporary RFID device (since it is clearly destined to be removed the first time the tire is fitted on the corresponding rim), which, for it is not shielded by the tires (is it arranged on the outside), can be read from a definitely greater distance compared to RFID devices incorporated in the structure of the tires. However, this solution does not completely solve the problem because, in case of use of a forklift provided with a clamp laterally clamping the stack of tires, the clamp (clearly made of metal) can cover the additional RFID device, which is applied to the tread, thus completely shielding it, or, in the worst case scenario, the clamp can even destroy the additional RFID device, which is applied to the tread; therefore, at least two identification labels (each supporting an additional and temporary RFID device) need to be applied on the tread and be arranged at approximately 90° relative to one another (in this way, at least one identification label always is free when the stack of tires is laterally clamped by a clamp). However, this solution doubles costs, since two different identification labels have to be applied on each tire. Furthermore, according to this solution, each identification label has to face the antenna of the reader (namely, the identification label has to be in "LOS—Line Of Sight" with the antenna of the reader) and, hence, the antenna of the reader needs to be moved all around the stack of tires in order to read the temporary RFID devices of all the tires of the stack; indeed, when an identification label is on the opposite side of the tire relative to the antenna of the reader, all the metal and the "lossy material" of the tire shield the identification label (or, anyway, jeopardize the performances of the identification label), thus making it difficult, if not impossible, for the corresponding temporary RFID device to be read.

DESCRIPTION OF THE INVENTION

The object of the invention is to provide a tire provided with a temporary identification label, said tire not being affected by the drawbacks described above and, at the same time, being easy and economic to be manufactured.

According to the invention, there is provided a tire provided with a temporary identification label according to the appended claims.

According to the invention, there are also provided a logistics system to handle a tire warehouse and a method to handle a tire warehouse as set forth in the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
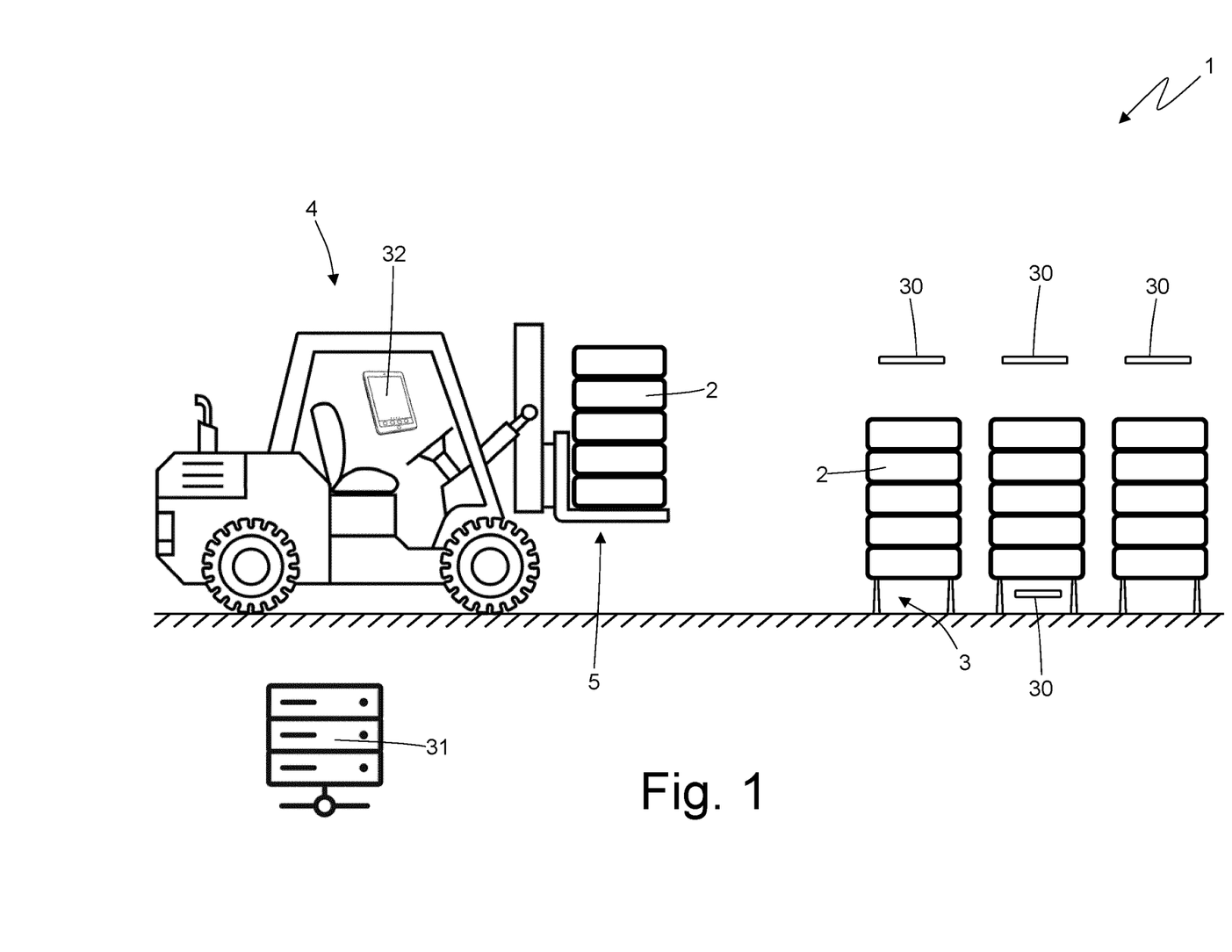
FIG. 1 is a schematic view of a warehouse for tires that have to be loaded into a container or truck in order to be delivered to customers and are each provided with a temporary identification label.

In FIG. 1, number 1 indicates, as a whole, a warehouse for so-called TBR ("Truck and Bus Radial") tires 2, which have to be loaded into a container or truck in order to be delivered to customers.

Inside the warehouse 1 there are a plurality of support elements 3, each designed to support a vertically oriented stack of tires 2 at a given distance from the ground (i.e. from the floor of the warehouse 1); in other words, the support elements 3 are shelves or racks, which support the stack of tires 2 keeping them lifted from the ground. It should be pointed out that a stack of tires 2 can be oriented vertically (as shown, for example, in FIG. 1) or can be oriented horizontally (as shown, for example, in FIG. 6, 7 or 8); in a vertically oriented stack of tires 2, the tires 2 are placed on top of one another, thus increasing the height of the stack, whereas, in a horizontally oriented stack of tires 2, the tires 2 are place next to one another, thus increasing the length of the stack. Obviously, in the same warehouse 1 there can be vertically oriented stacks of tires 2 as well as horizontally oriented stacks of tires 2.

A series of forklifts 4 operate inside the warehouse 1, namely they move the stack of tires 2 and, in particular, place the stack of tires 2 coming from the production lines on the support elements 3 as well as retrieve the stack of tires 2 from the support elements 3 in order to insert the stack of tires 2 into containers or trucks.

Each forklift 4 is an operating means provided with wheels, which is operated by an electric motor, a Diesel engine or a gas engine and comprises a holding device 5, which is arranged at the front and is designed to pick up a stack of tires 2. In the embodiment shown in the accompanying figures, the holding device 5 consists of a pair of forks (only one of them being visible in the accompanying figures), which lift the stack of tires 2 from the bottom; according to a different embodiment which is not shown herein, the holding device 5 consists of a clamp, which laterally clamps the stack of tires 2.

Figure 2:
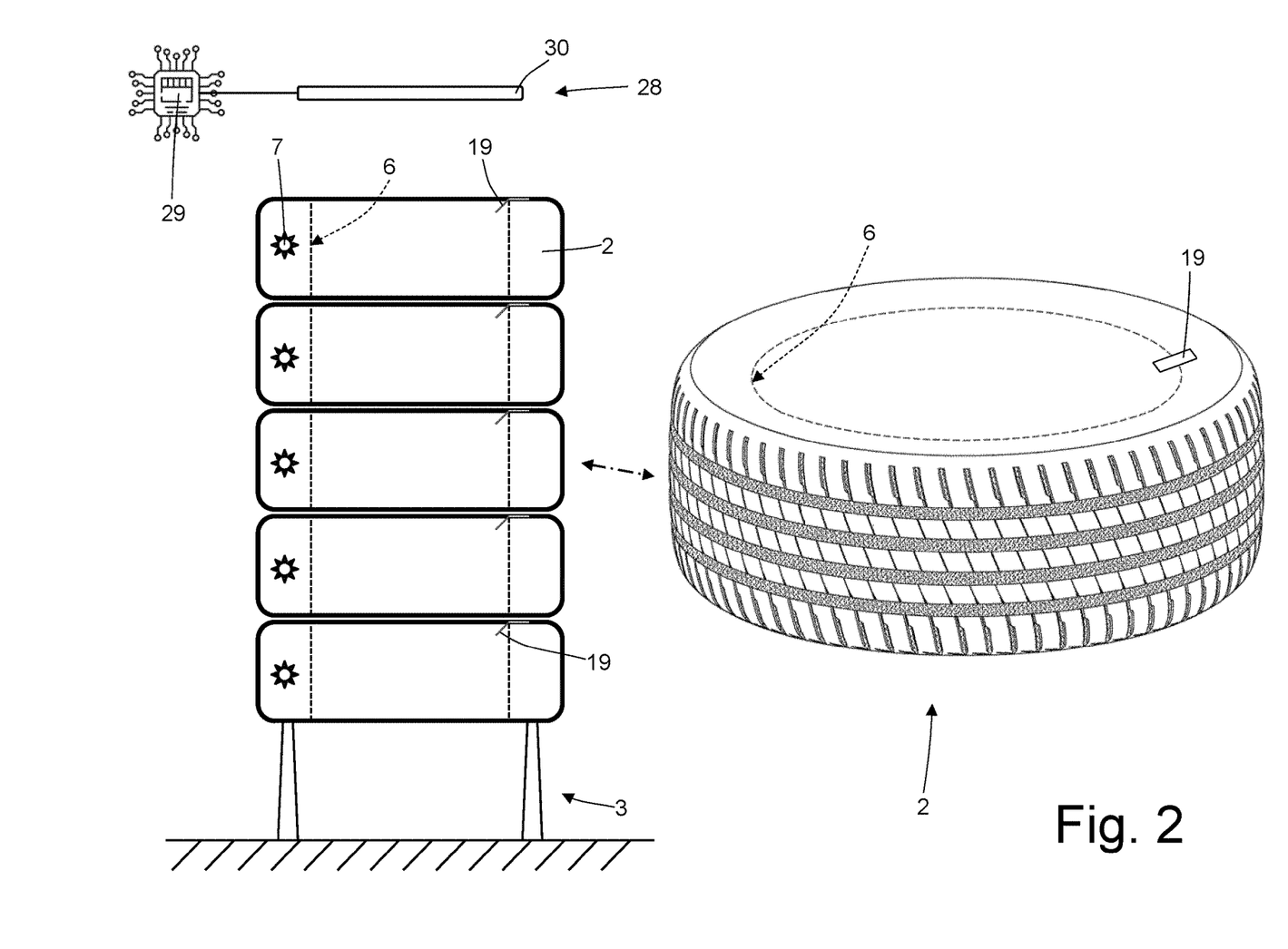
FIG. 2 is a schematic view of a stack of tires standing in the warehouse of FIG. 1.
Figure 3:
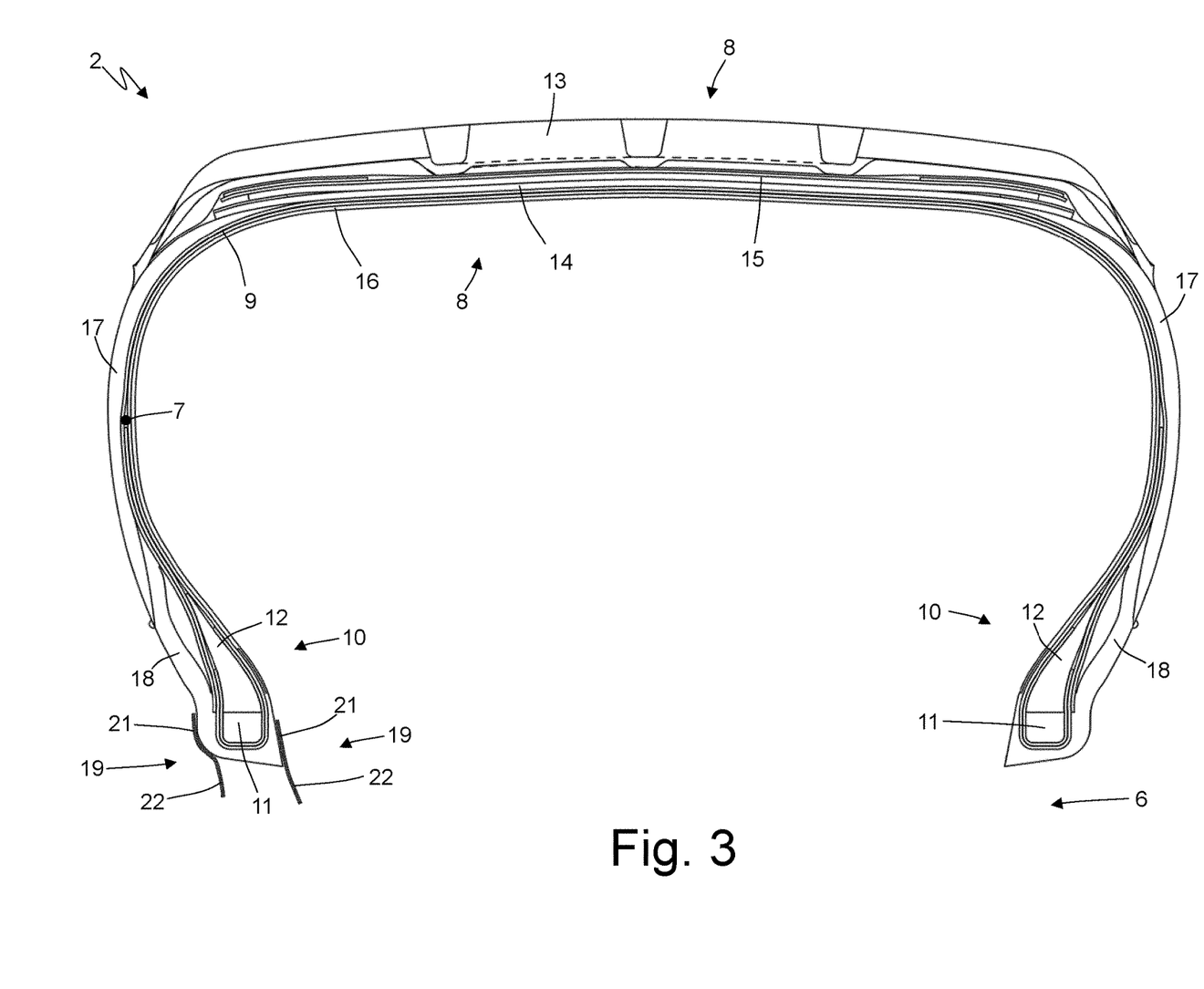
FIG. 3 is a schematic cross section, with parts removed for greater clarity, of a tire available in the warehouse of FIG. 1.

According to FIGS. 2 and 3, each tire 2 has an annular shape having a central cavity 6. Furthermore, each tire 2 is provided with a permanent RFID device 7 (in particular, a transponder, a tag, a smart label) of its own, namely an electronic device (which normally is passive, namely not provided with a power supply of its own), which is capable of storing information (in particular, an univocal identification code associated with the tire 2) and is capable of communicating through radio frequency. According to a preferred embodiment, each permanent RFID device 7 can store the so-called "Unique Item Identifier—UII" for applications in the tire industry in accordance with the ISO 20910 standards and coded with a "SGTIN-96" coding ("96 bits—Serialized Global Trade Item Number") according to the "GS1 EPC Tag Data" standard.

In other words, each permanent RFID device 7 is a small-sized smart label, which is integrated inside the tire 2 and is designed to reply to the interrogation made from a distance by suitable fixed or portable apparatuses, known as readers (or interrogator devices); a reader is capable of reading and/or writing, the information contained in the permanent RFID device 7 by communicating with the permanent RFID device 7 through radio frequency. As a consequence, the permanent RFID device 7 is part of a wireless reading and/or writing system operating according to the so-called RFID ("Radio-Frequency Identification") technology.

According to FIG. 3, each tire 2 comprises a toroidal carcass 2, which consists of a body ply 9, which is partially folded onto itself and, therefore, has two "turn-ups" (namely, two overlapping layers) on the sides. In each turn-up of the body ply 9, an edge (namely, a final end) of the body ply 9 rests against an intermediate portion of the body ply 9.

On the opposite sides of the carcass 2 there are two annular beads 10, each surrounded by the body ply 9 (namely, surrounded by the turn-ups of the body ply 9) and having a bead core 11, which is reinforced with a number of metal wire loops, and a bead filler 12; in other words, the bead core 11 consist of steel wires embedded in rubber and ensures a perfect coupling between the tire 2 and the rim. As a consequence, each bead core 11 is basically made up of metal material, namely it mainly is a metal object covered by a relatively thin rubber layer.

The carcass 2 supports an annular tread 13; between the carcass 2 and the tread 13, a tread belt 14 is interposed, which comprises two tread plies 15. Each tread ply 15 comprises a number of cords (not shown), which are embedded within a rubber belt, are arranged alongside one another with a given pitch and form an angle of inclination determined in relation to an equatorial plane of the tire 2.

Inside of the body ply 9 there is an innerliner 16, which is impermeable to air, constitutes an inner coating and has the function of holding air inside the tire 2 in order to preserve the inflation pressure of the tire 2 over time.

The body ply 9 supports a pair of sidewalls 17, which are arranged on the outside of the body ply 9 between the tread 13 and the beads 10.

Finally, the body ply 9 supports a pair of abrasion gum strips 18, which are arranged on the outside under the sidewalls 17 and in the area of the beads 10.

Inside each tire 2, in particular in the area of a sidewall 17 (for example, the outer sidewall 17, namely the one facing outwards from the vehicle once the tire 1 sits on the rim), there is integrated (embedded) the permanent RFID device 7.

Figure 4:
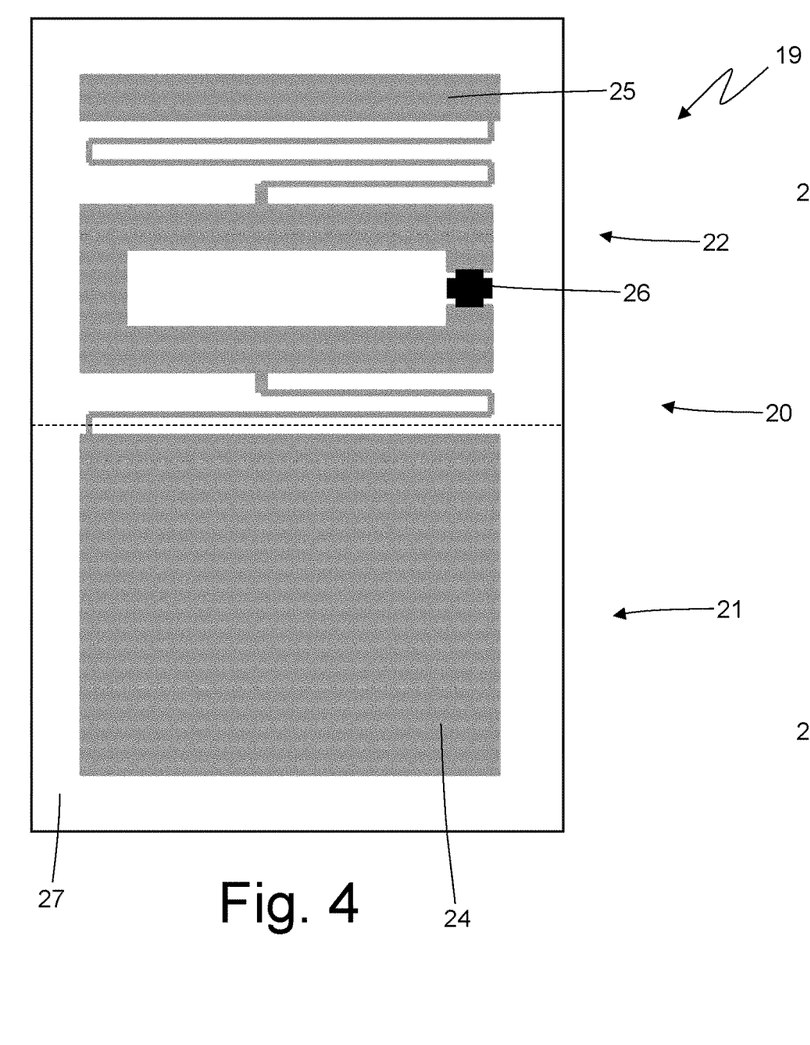
FIGS. 4 and 5 are two schematic views, a front view and a lateral view respectively, of a temporary identification label fixed to a tire available in the warehouse of FIG. 1.

According to FIGS. 2 and 3, each tire 2 is also provided with (at least) an identification label 19, which is fixed in a removable manner by means of gluing and supports a temporary RFID device 20 which can be read from a distance (shown in FIG. 4). It should be pointed out that, in each tire 2, the permanent RFID device 7 is integrated inside the tire 2 and, hence, always remains coupled to the tire 2 (and is used, in use, when the tire 2 sits on the rim), whereas the temporary RFID device 20 is only used inside the warehouse 1 and, if necessary, during the transportation of the tire 2 to the end user, but it is normally removed from the tire 2 (and, hence, thrown away) before fitting the tire 2 on the rim. The temporary RFID device 20 is a "double" of the permanent RFID device 7, namely it is a "replica" of the permanent RFID device 7, which is used because it can (much) more easily be read when the tire 2 is in a stack (as discussed below). As a consequence, the temporary RFID device 20 contains at least part of the information contained in the permanent RIFD device 7 and, in particular, it always contains the information that allows the tire 2 to be identified (for example, its serial number); in particular, the temporary RFID device 20 contains the so-called "Unique Item Identifier—UII" described above.

In each tire 2, the identification label 19 (supporting the temporary RFID device 20) is arranged in the area of an annular bead 10 and, in particular, radially overlaps the bead core 11 (preferably, though not necessarily, the identification label 19 radially overlaps the sole core bead 11, namely it does not extend past the bead core 11 and, hence, does not reach the bead filler 12). FIG. 3 shows two different (and perfectly equivalent) positions of the identification label 19 in a tire 2: the identification label 19 can be connected to an outer edge of an annular bead 10 or the identification label 19 can be connected to an inner edge of an annular bead 10; FIG. 3 shows two identification labels 19 in the two different positions, but, obviously, in reality there is one single identification label 19. It should be pointed out that the identification label 19 is arranged in the area of a bead core 11 (namely, it radially overlaps the bead core 11), but it is not in direct contact with the bead core 11, as the bead core 11 is covered, on the outside, by an abrasion gum strip 18.

Figure 5:
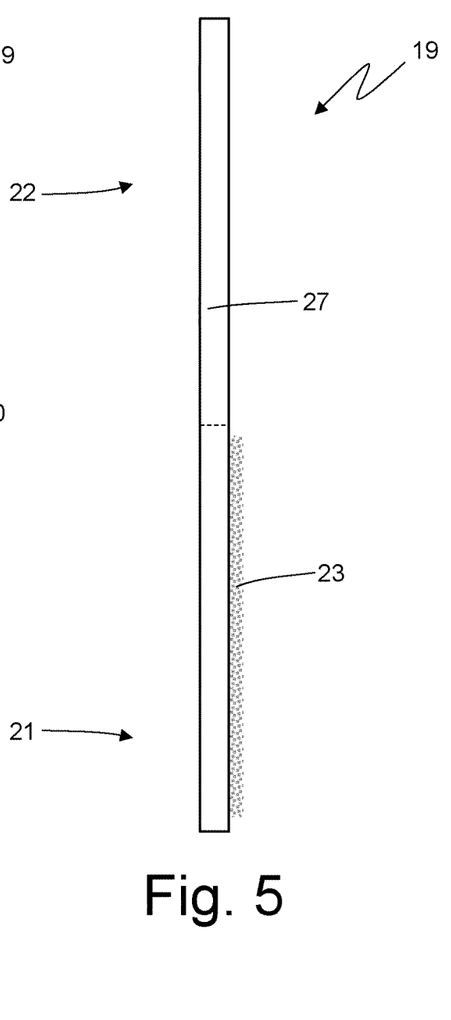

According to FIGS. 3, 4 and 5, each identification label 19 has an outer portion 21 (namely, radially arranged more on the outside), which is fixed (glued) in the area of the bead core 11 (namely, radially overlaps the bead core 11), and an inner portion 22 (namely, radially arranged more on the inside), which projects in a free manner, namely like a flag, from an annular edge of the central cavity 6 of the tire 2 towards a centre of the central cavity 6. As a consequence, in each identification label 19, the outer portion 21 of the identification label 19 has a connection surface, which is fixed (in particular glued by means of a glue 23) in the area of the bead core 11; on the other, in each identification label 19, the inner portion 22 of the identification label 19 is completely free and hanging in the area, namely all the surfaces of the inner portion 22 are in the air and do not touch any part of the tire 2.

Each identification label 19 is fixed (glued) to an outer surface of a tire 2 by means of a glue 23 (adhesive 23), which allows the identification label 19 to be subsequently removed in a relatively simple manner; for example, it is possible to use a non-drying re-stick glue 23 (adhesive 23), which, hence, allows the identification label 19 to be relatively easily removed from the outer surface of the corresponding tire 2.

According to a preferred (though, non-binding) embodiment shown in FIG. 4, each temporary RFID device 20 comprises an antenna comprising an element 24, which is arranged in the outer portion 21 (and, hence, on one side is adjacent to the bead core 11), and an element 25, which is arranged in the inner portion 22 (and, hence, is completely in the air). According to the figures, the elements 24 and 25 consist of respective (electrically conductive) metal plates, which are flat and have a rectangular shape.

Furthermore, the element 24 preferably is larger than the element 25; in particular, the element 24 has an extension ranging from 5 to 10 times the extension of the element 25. The element 24 of the antenna of each temporary RFID device 20 is arranged in the area of the bead core 11 and uses a metal component of the bead core 11 as part of the radiating or radiator element (namely, as antenna part) in order to increase the performances of the antenna of the temporary RFID device 20. In the embodiment shown in FIG. 4, the antenna of the temporary RFID device 20 has a monopole antenna configuration, in which the element 24 is the ground plane and the element 25 or radiating or radiator element is meandered in order to minimize dimensions. In particular, the two elements 24 and 25 of the antenna of the temporary RFID device 20 are obtained by means of a linear electrical conductor, where the electric currents irradiating the electromagnetic field from a distance flow. Furthermore, each temporary RFID device 20 comprises a microchip 26 (namely, a miniaturized electronic circuit), which is connected to the two antennas 24 and 25 and is provided with a non-volatile memory (typically, an EEPROM or FRAM memory, the latter being more expensive, but more technologically advanced). The microchip 26 can be provided with an automatic tuning mechanism, which is capable of automatically adjusting its inner impedance in order to optimize and improve readability performances, thus allowing for a greater tolerance in the production and in the positioning of the identification labels 19.

Each identification label 19 comprises a support 27, on which the temporary RFID device 20 is housed and which typically consists of a thin sheet of Mylar, plastic such as PET or PVC or other similar materials.

In the embodiment shown in the appended figures, each tire 2 comprises both (at least) a permanent RFID device 7, which is integrated inside the tire 2, and (at least) a temporary RFID device 20, which is glued on the outside of the tire 2; according to a different variant, a tire 2 could only comprise (at least) a temporary RFID device 20 glued on the outside of the tire 2, namely the tire 2 could lack the permanent RFID device 7 integrated inside the tire 2.

According to a preferred embodiment shown in FIG. 2, reader devices 28, each comprising an electronic control unit 29 and an antenna 30, are arranged in the warehouse 1 in a fixed position. Each antenna 30 works so as to radiate/receive RF signals having frequencies in a "UHF—Ultra High Frequency" band, preferably within a range of frequencies ranging from 860 to 960 MHZ, more preferably within a sub-range of frequencies ranging from 865 to 868 MHz and/or within a sub-range of frequencies ranging from 902 to 928 MHz. Furthermore, the optional requirements of each antenna 30 can conveniently include a gain exceeding 0 dB and circular polarization.

Figure 8:
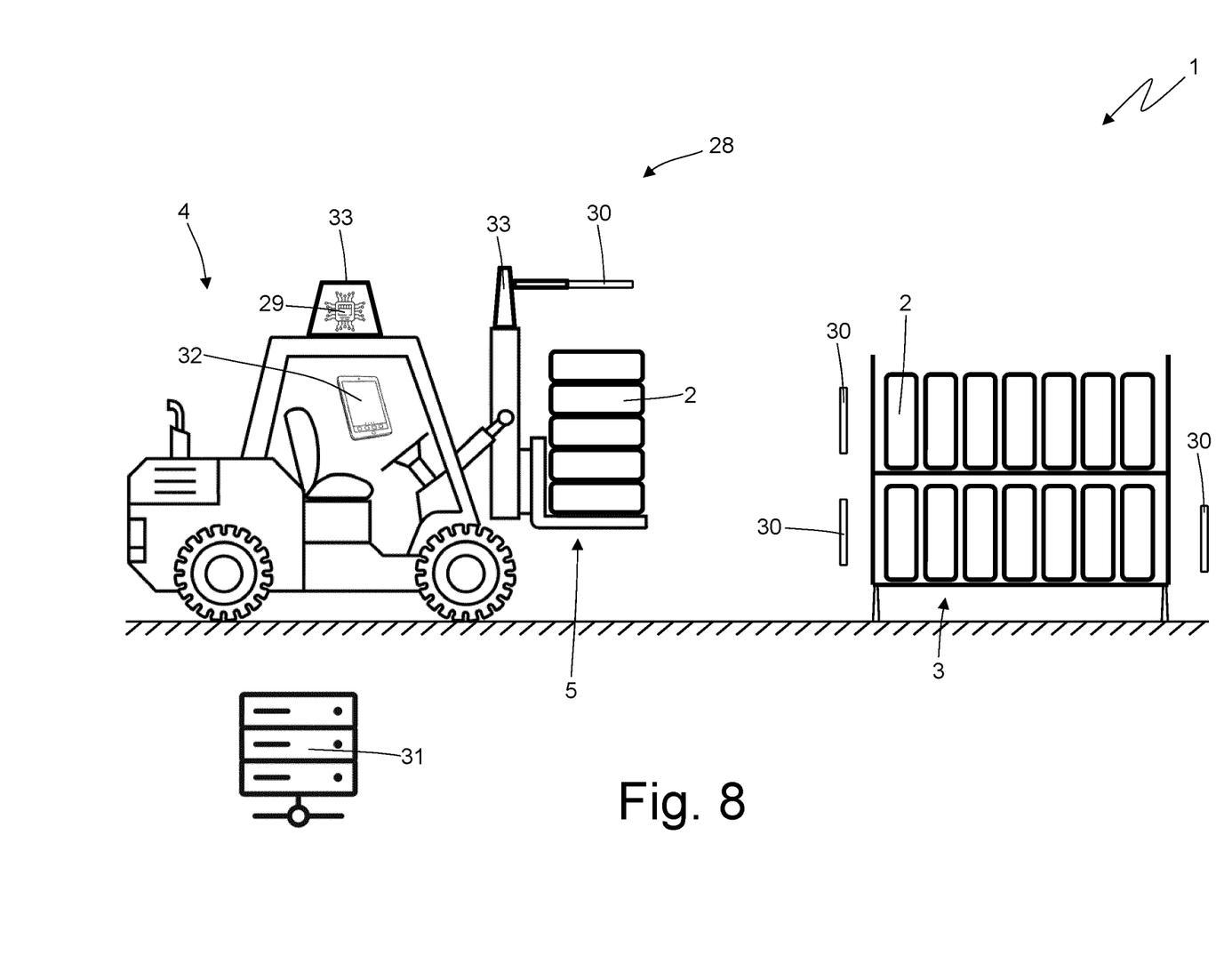

According to FIG. 1, some antennas 30 are horizontally arranged at a given height (greater than the maximum height of stack of tires 2) so as to read the temporary RFID devices 20 of the tires 2 of the vertical stacks. According to FIG. 6 or to FIG. 8, some antennas 30 are vertically arranged in positions deemed to be suitable to read the temporary RFID devices 20 of the tires 2 of the horizontal stacks; for example, one or two antennas 30 can be arranged on the sides of a door/gate through which the support elements 3 supporting at least one horizontally arranged stack of tires 2 are caused to pass. Generally speaking, a horizontal antenna 30 can read the temporary RFID devices 20 of the tires 2 of the vertical stacks (as shown in FIG. 8) or a vertical antenna 30 can read the temporary RFID devices 20 of the tires 2 of the horizontal stacks. Indeed, in order to effectively read the temporary RFID devices 20 of the tires 2 of a stack, the antenna 30 must face the central cavities 6 of the stacked tires 2 so as to "see" all the corresponding temporary RFID devices 20 located in the central cavities 6; as a consequence, in order to "see" all the temporary RFID devices 20 of the tires 2 of a vertical stack of tires 2, the antenna 30 must be oriented horizontally and must be located above or under the stack, whereas, in order to "see" all the temporary RFID devices 20 of the tires 2 of a horizontal stack of tires 2, the antenna 30 must be oriented vertically and must be located on the side of the stack.

In other words, each stack of tires 2 to be identified is placed close to the antenna 30 of the reader device 28, in particular under the antenna 30 or next to the antenna 30, so that the antenna 30 faces and is aligned with a central cavity 6 of the tires 2 making up the stack.

According to a preferred embodiment, one single antenna 30 is sufficient to read all the temporary RFID devices 20 of the tires 2 of a stack of tires 2, namely said single antenna 30 is arranged at one single end (above, under or beside) of the stack; alternatively and for greater certainty (confidence) two antennas 30 can be used to read all the temporary RFID devices 20 of the tires 2 of a stack of tires 2, namely the two antennas 30 are arranged opposite one another at the two ends (above, under or beside) of the stack.

However, it should be pointed out that, theoretically speaking, an antenna 30, regardless of its orientation, could anyway read the temporary RFID devices 20 of the tires 2 of stacks that are arranged both vertically and horizontally.

In use, a stack of tires 2 to be identified is placed in the reading field of an antenna 30 (namely, under the antenna 30 or beside the antenna 30) of a reader device 28 so as to allow the reader device 28 to read the temporary RFID devices 20 of all the tires 2; in particular, a stack of tires 2 (generally carried by the holding device 5 of a forklift 4) can briefly be stopped in the area of an antenna 30 of a reader device 28 or can be caused to slowly move forward in the area of the antenna 30 of a reader device 28. If, besides reading the temporary RFID devices 20 of all the tires 2, the reader device 28 happened to also read one or more permanent RFID devices 7, the reading of the permanent RFID devices 7 would simply be redundant relative to the reading of the temporary RFID devices 20 and could be ignored as a "double" without causing any kind of problem. In particular, according to the "RFID EPC Gen2 GS1" protocol, when two RFID devices 7 and 20 with the same name and, hence, without univocal EPCs are read, one single RFID device 7 or 20 present in the reading field is signalled following the interrogation of the reader device 28.

Owing to the above, the warehouse 1 is evidently provided with a logistics system, which allows the handling of the tires 2 to be managed in a highly automated manner thanks to an autonomous reading (namely, without the manual intervention of an operator) of the temporary RFID devices 20 coupled to the tires 2. In particular, the reader devices 28 are connected to a control server 31 of the warehouse 1 (schematically shown in FIG. 1); the control server 31 is also connected to a tablet computer 32 (or to a similar portable device), which is used by an operator of a forklift 4. Through the tablet computer 32, an operator of a forklift 4 receives operating indications from the control server 31 and communicates the execution of the tasks assigned to the control server 31 so as to update in real time the state of the warehouse 1, namely of the tires 2 stored and retrieved and currently present in the warehouse 1. In other words, the control server 31 runs a management software, which handles the communication between the reader devices 28 and human operators (some of them driving the forklifts 4).

According to possible (though, non-binding a embodiment, in order to allow the operator of a forklift 4 to quickly and confidently make sure that a reader device 28 has read all the temporary RFID devices 20 of the tires 2 making up a stack carried by the holding device 5 (a stack of TBR truck tires 2 generally consists of five to eight TBR tires 2 on top of one another or next to one another, depending on the size of the tires 2), the operator, each time, has to enter (type in) the number of tires 2 loaded on the holding device 5 using the tablet computer 32 (the software installed in the tablet computer 32 could already suggest to the operator a pre-defined limited selection of numbers of tires 2 loaded on the holding device 5); the software installed in the tablet computer 32 checks whether the number of temporary RFID devices 20 read by the reader device 28 corresponds to (namely, is the same as) the number of tires 2 loaded on the holding device 5 of the forklift 4 (provided by the operator): in case the numbers are the same, the software provides a positive signal (for example, by means of a green light) and the reading operation undergone by the temporary RFID devices 20 is concluded, whereas, in case the numbers are not the same, the software provides a negative signal (for example, by means of a red light and an acoustic warning) and the reading operation undergone by the temporary RFID devices 20 must be repeated.

It should be pointed out that a same reader device 28 could comprise several antennas 30 arranged in different positions (anyway, close to one another) and activated in different instants by the electronic control unit; in this way, a driver of a forklift 4 transporting (at least) a stack of tires 2 does not have to follow with precision a predetermined set route, but can even (more or less accidentally) deviate from the predetermined set route, as the plurality of antennas 30 allow the operator to cover a relatively large area around the predetermined set route.

Figure 6:
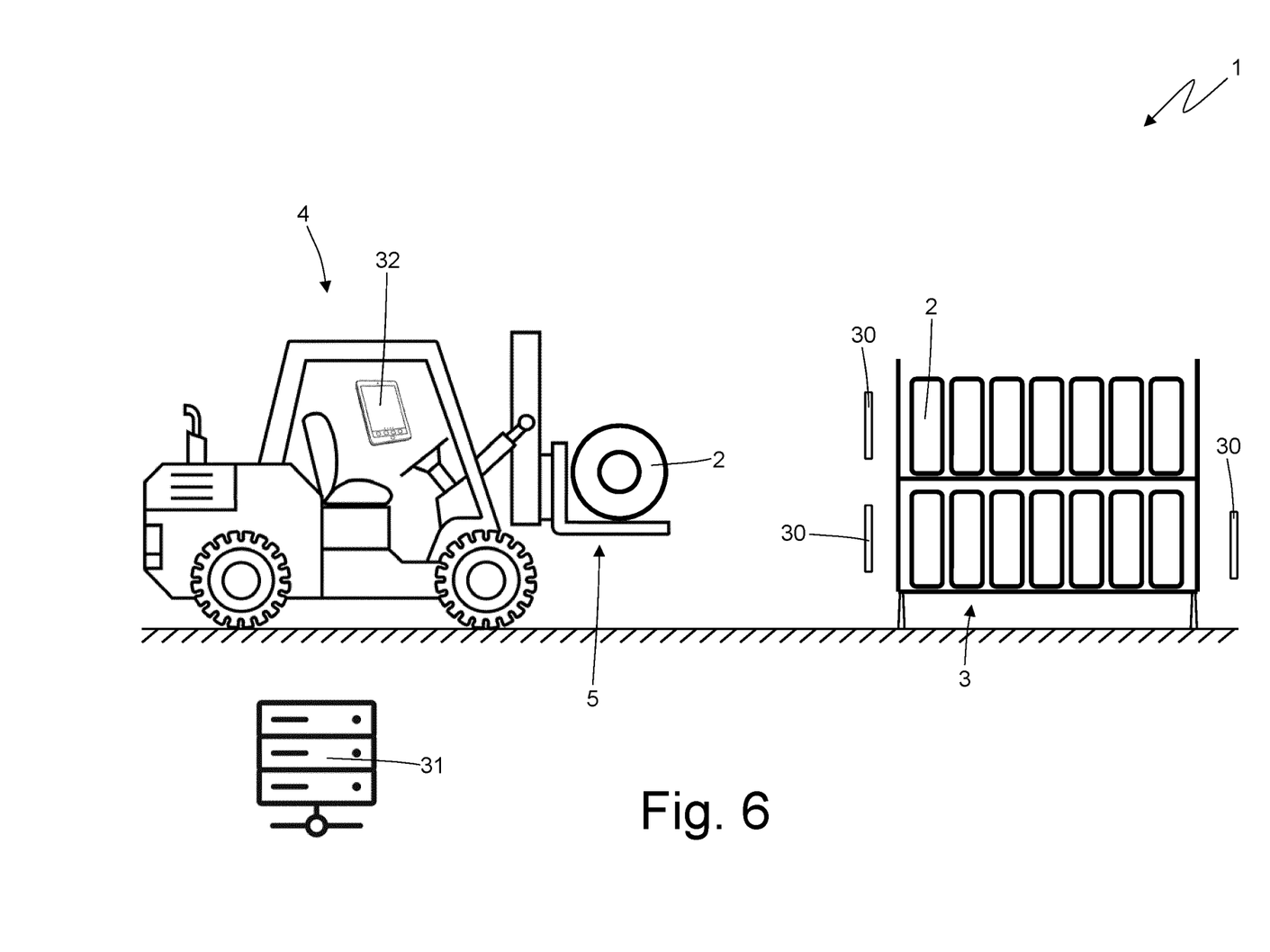
FIG. 6 is a schematic view of the warehouse of FIG. 1 highlighting the stacks of tires oriented horizontally instead of vertically like in FIG. 1.
Figure 7:
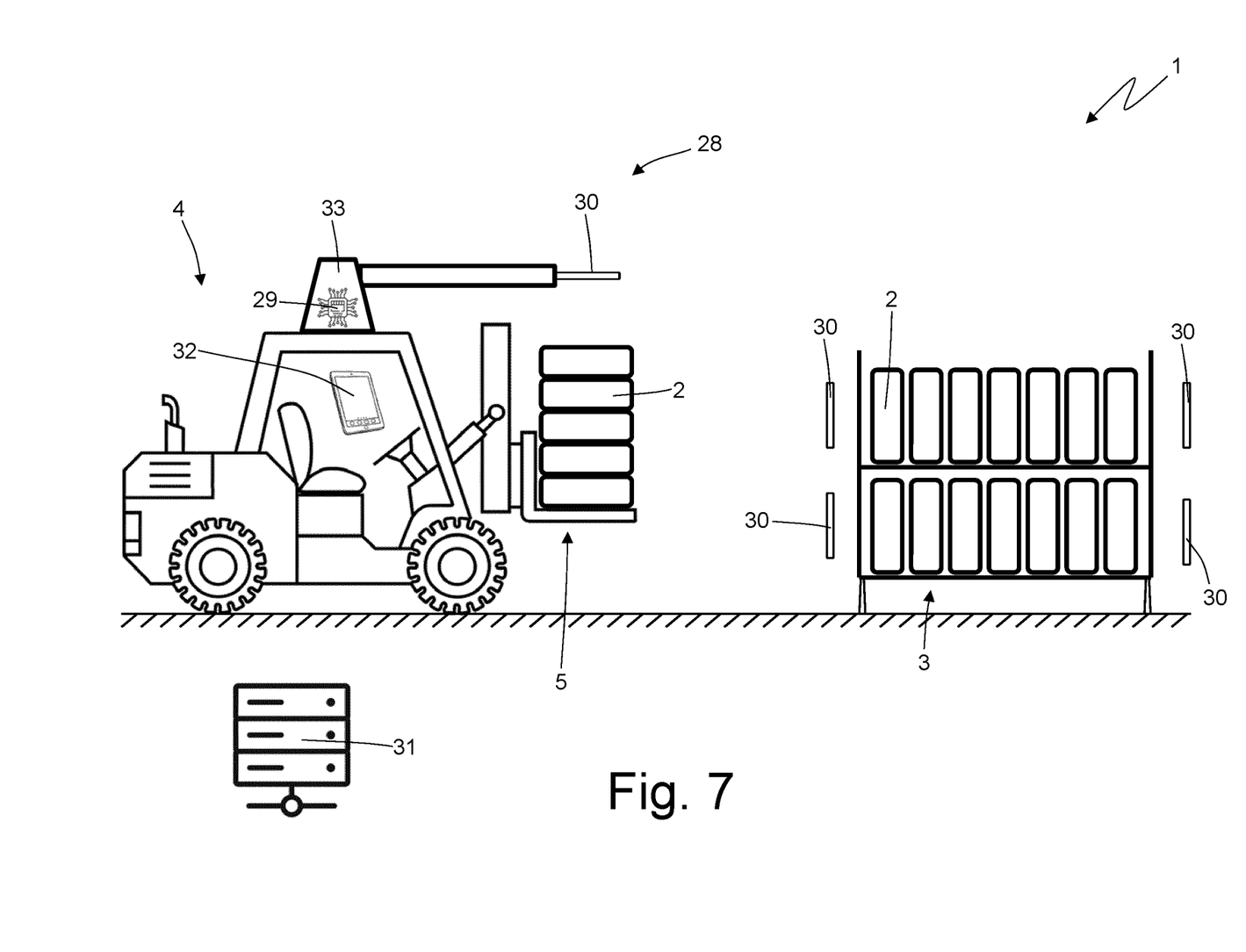
FIGS. 7 and 8 are schematic views of the warehouse of FIG. 1 with respective variants of a forklift.

In the embodiment shown in FIGS. 1, 2 and 6, the antennas 30 of the reader devices 28 are arranged in a fixed position inside the warehouse 1, namely the antennas 30 of the reader devices 28 are mounted on fixed structures of the warehouse 1. In the variant shown in FIGS. 7 and 8, at least one reader device 28 is installed on board a forklift 4; in particular, the forklift 4 comprises a support device 33 (for example, mounted on the roof of the forklift 4), which supports the antenna 30 so as to place the antenna 30 close (typically, though not necessarily, above) the stack of tires 2 (or the stacks of tires 2) carried by the holding device 5 of the forklift 4. The support device 33 could also have a telescopic arm to move, only when needed, the antenna 30 close (typically, though not necessarily, above) the stack of tires 2 (or the stacks of tires 2) carried by the holding device of the forklift 4. The antenna 30 (or the antennas 30) of the reader device 28 installed on board a forklift 4 could also be mounted on a frame of the holding device 5.

The embodiments described herein can be combined with one another, without for this reason going beyond the scope of protection of the invention.

The tire 2 described above has numerous advantages.

First of all, the tire 2 described above allows for an efficient (quick) and effective (confident) identification of all the tires 2 making up a stack by means of a reader device 28 provided with one single antenna 30 arranged in a fixed position (hence, by means of a simple, economic and simple-to-use reader device 28). This result is obtained thanks to the particular positioning of the identification labels 19, which allows them to always be read in a confident manner, even when the tires 2 are stacked; indeed, the central cavities 6 of the tires 2 (where the identification labels 19 are located) are always free from electromagnetic shielding (due to the Faraday cages created by the metal elements of the tires 2) even when the stacked tires 2 are handled.

Furthermore, the particular conformation of the antennas 24 and 25 of the temporary RFID devices 20 allows the usable reading distance of the temporary RFID devices 20 to be amplified exploiting part of the metal mass (namely, the bead cores 11) of the tires 2, which, instead of being a disturbing element (for the reading of the permanent RFID devices 20), becomes a useful element (for the reading of the temporary RFID devices 20). Some experiments have shown that a reader device 28 provided with one single antenna 30 oriented horizontally or vertically is capable of reading the temporary RFID devices 20 of all the tires 2 of a stack up to a distance of 6-8 metres from the tire 2 of the stack that is the farthest from the antenna 30.

In addition, the positioning of the identification labels 19 inside the tires 2 (namely, in the area of the central cavity 6 of the tires 2, projecting towards the inside starting from a bead 10) makes the identification labels 19 extremely protected and, hence, substantially unaffected by damages or unintentional detachments; indeed, the areas of the beads 10 are never touched in any way during the handling thereof.

Finally, the identification labels 19 are inexpensive (and thus represent a negligible part of the total manufacturing cost of the tire), as the temporary RFID devices 20 (for they also exploit part of the metal mass of the tires 2) can have relatively small antennas 24 and 25.

Besides, it should be pointed out that for each tire 2 it always is sufficient to apply one single identification label 19, since even one single identification label 19 is always read from the top, regardless of the orientation of the tire 2 and of the way in which the stack is held; anyway, it should be pointed out that coupling one single tire 2 to two or more identification labels 19 is not forbidden (even though it is substantially useless).

The invention finds advantageous application in the handling of so-called TBR ("Truck and Bus Radial") tires 2, but, anyway, it can be applied to tires 2 of any type (larger or also smaller than so-called TBR tires 2).

The invention claimed is:
1. A tire comprising:
   a toroidal carcass having a central cavity;
   a plurality of annular beads, each having at least one bead core; and
   an identification label, which is removably fixed to a surface of the toroidal carcass, and supports a temporary RFID device which is readable from a distance;
   wherein the identification label is arranged in the area of a respective one of the plurality of annular beads.
2. The tire of claim 1, wherein the identification label is fixed using glue.
3. The tire of claim 1, wherein the identification label radially overlaps the bead core of the respective one of the plurality of annular beads.
4. The tire of claim 3, wherein the identification label does not radially extend past the bead core of the respective one of the plurality of annular beads.
5. The tire of claim 1, wherein the identification label comprises an outer portion which is glued in the area of the bead core of the respective one of the plurality of annular beads, and an inner portion which projects freely from an annular edge of the central cavity of the tire towards a centre of the central cavity.
6. The tire of claim 5, wherein the outer portion of the identification label has a connection surface, which is glued in the area of the bead core of the respective one of the plurality of annular beads.
7. The tire of claim 5, wherein all surfaces of the inner portion of the identification label are completely free and hanging in the air.
8. The tire of claim 5, wherein the temporary RFID device comprises an antenna having a first element arranged in the outer portion and a second element arranged in the inner portion.
9. The tire of claim 8, wherein the first element of the antenna of the temporary RFID device is in the area of the bead core of the respective one of the plurality of annular beads, wherein performance of the antenna is increased in view of a metal component of the bead core.
10. A logistics system for a warehouse for tires, in which the tires are arranged in stacks and are each provided with a toroidal carcass having a central cavity, a plurality of annular beads each having at least one bead core, and an identification label which is removably fixed to a surface of the toroidal carcass, the system comprising:
    for each tire, the identification label supporting a temporary RFID device which is readable from a distance and arranged in the area of a respective one of the plurality of annular beads; and
    a reader device configured to read the RFID devices from a distance and comprising at least one antenna.
11. The system of claim 10, wherein a stack of tire to be identified is placed under or next to the antenna of the reader device, wherein the antenna faces and is aligned with a central cavity of the tires making up the stack.
12. The system of claim 10, wherein the reader device comprises a plurality of antennas, which are alternatively activated to increase an area covered by the reading.
13. The system of claim 10, wherein the identification label is fixed using glue.
14. The system of claim 10, wherein the identification label radially overlaps the bead core of the respective one of the plurality of annular beads, and does not radially extend past the bead core of the respective one of the plurality of annular beads.
15. The system of claim 10, wherein the identification label comprises an outer portion which is glued in the area of the bead core of the respective one of the plurality of annular beads, and an inner portion which projects freely from an annular edge of the central cavity of the tire towards a centre of the central cavity.
16. The system of claim 15, wherein the temporary RFID device comprises an antenna having a first element arranged in the outer portion and a second element arranged in the inner portion.
17. The system of claim 16, wherein the first element of the antenna of the temporary RFID device is in the area of the bead core of the respective one of the plurality of annular beads, and wherein performance of the antenna is increased in view of a metal component of the bead core.
18. A method of operating a warehouse for tires, in which the tires are each provided with a toroidal carcass having a central cavity, and a plurality of annular beads each having at least one bead core, the method comprising:
    applying an identification label to each tire in a removable manner and arranged in the area of a respective one of the plurality of annular beads, wherein the identification label for each tire supports a respective temporary RFID device which is readable from a distance; and
    stacking the tires in one or more stacks.
19. The method of claim 18, comprising:
    installing a reader device which is configured to read the RFID devices from a distance and comprises at least one antenna; and
    placing a stack of tires to be identified, of the one or more stacks, under the antenna or next to the antenna so that the antenna of the reader device faces and is aligned with a central cavity of the tires making up the stack.
20. The method of claim 18, comprising alternatively activating a plurality of antennas associated with the reader device to increase an area covered by the reading.

* * * * *